G. W. LAING.
NUT LOCK.
APPLICATION FILED MAR. 18, 1913.
1,072,336.
Patented Sept. 2, 1913.
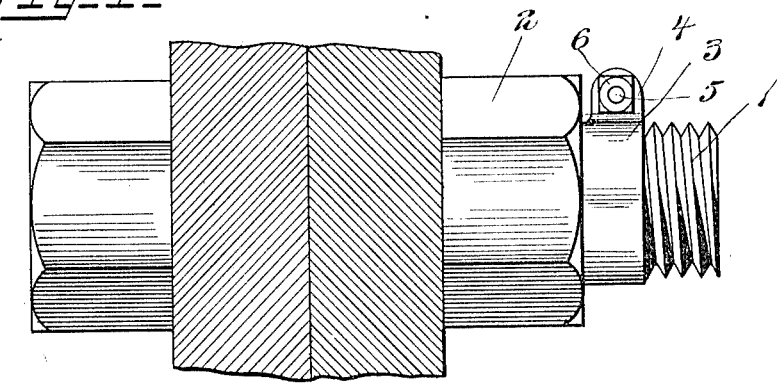
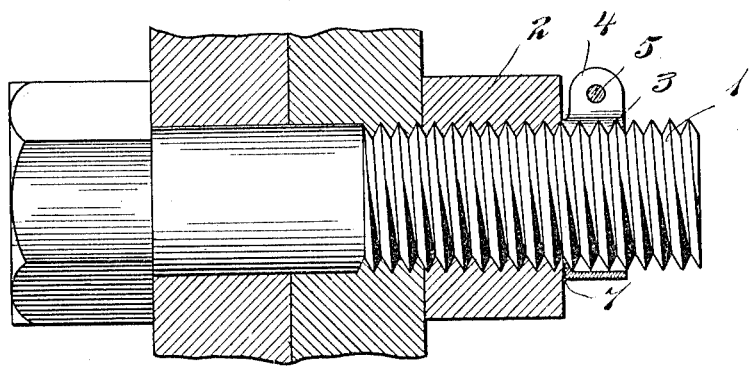
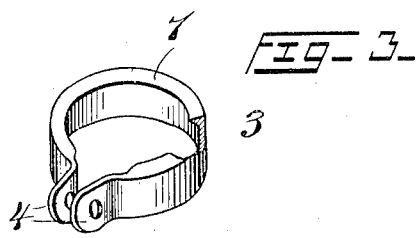
Inventor
G. W. Laing
Witnesses
By Victor J. Evans
Attorney

UNITED STATES PATENT OFFICE.

GEORGE W. LAING, OF CURWENSVILLE, PENNSYLVANIA.

NUT-LOCK.

1,072,336.  Specification of Letters Patent. Patented Sept. 2, 1913.

Application filed March 18, 1913. Serial No. 755,204.

*To all whom it may concern:*

Be it known that I, GEORGE W. LAING, a citizen of the United States, residing at Curwensville, in the county of Clearfield and State of Pennsylvania, have invented new and useful Improvements in Nut-Locks, of which the following is a specification.

The present invention relates to improvements in means for sustaining a nut in locked position upon a bolt to prevent the unscrewing of the nut from the bolt, and resides in the construction, combination and arrangement of parts set forth in the following specification and falling within the scope of the appended claim.

In the drawing: Figure 1 is a view illustrating the improvement in applied position upon a bolt to prevent the unscrewing of the nut from the bolt, Fig. 2 is a longitudinal sectional view through the same, and Fig. 3 is a detail perspective view of the locking or securing element.

Referring now to the drawing in detail, the numeral 1 designates a bolt and 2 the nut for the bolt. The nut and the bolt are of the ordinary construction, and the numeral 3 designates my improvement which is adapted to be secured upon the bolt and to engage with the outer face of the nut. The member 3 comprises a split resilient sleeve having its ends provided with outturned ears 4, each of which having an opening for the reception of a screw 5, the said screw co-acting with a nut 6, and the nut is adapted to lie against one of the ears 4 and to bear against the face of the sleeve adjacent its juncture with said ear. By such an arrangement, it will be noted that the nut 6 cannot be unscrewed from the bolt, so that it is necessary to rotate the screw to force the ears 4 of the sleeve 3 together and to compress the said sleeve. The sleeve 3 has its body portion at one of its ends inturned to provide a flange 7, the said flange preferably having a knife edge, or the same being substantially V-shaped in cross section. After the nut 2 has been screwed home upon the bolt 1, the sleeve 3 is inserted over the bolt until its flanged end 7 contacts with the outer face of the nut. The screw 5 is then rotated to force the ears 4 together and to compress the sleeve 3 to force its knife edge flange 7 tightly into engagement between the threads of the bolt 1, and as a consequence, effectively lock the nut upon the bolt.

From the above description, taken in connection with the accompanying drawing, the simplicity of the device as well as the advantages thereof will, it is thought, be perfectly apparent to those skilled in the art to which such inventions appertain without further detailed description.

Having thus described the invention, what I claim as new is:

In a nut lock, the combination with a nut and a bolt for the nut, of a resilient member having an inturned flange and adapted to be placed over the bolt and into contact with the outer face of the nut, and means for compressing the said member to force its flange tightly into engagement between the threads of the bolt.

In testimony whereof I affix my signature in presence of two witnesses.

GEORGE W. LAING.

Witnesses:
 JOHN W. HAUPT,
 S. G. NORRIS.

---

Copies of this patent may be obtained for five cents each, by addressing the "Commissioner of Patents, Washington, D. C."